(12) United States Patent
Stanley

(10) Patent No.: US 7,494,948 B2
(45) Date of Patent: Feb. 24, 2009

(54) FREE FLOWING GLASS BATCH

(75) Inventor: Andrew Thomas Stanley, Ormskirk (GB)

(73) Assignee: Pilkington Group Limited, St. Helens (GB)

( * ) Notice: Subject to any disclaimer, the term of this patent is extended or adjusted under 35 U.S.C. 154(b) by 750 days.

(21) Appl. No.: 10/527,252

(22) PCT Filed: Sep. 8, 2003

(86) PCT No.: PCT/GB03/03880

§ 371 (c)(1), (2), (4) Date: Mar. 9, 2005

(87) PCT Pub. No.: WO2004/026780

PCT Pub. Date: Apr. 1, 2004

(65) Prior Publication Data

US 2006/0014620 A1 Jan. 19, 2006

(30) Foreign Application Priority Data

Sep. 20, 2002 (GB) .................................. 0221823.8

(51) Int. Cl.
 *C03C 6/00* (2006.01)
 *C03C 6/02* (2006.01)
 *C03C 6/10* (2006.01)
 *C03C 6/08* (2006.01)
 *C03C 6/04* (2006.01)

(52) U.S. Cl. ............................ 501/27; 501/28; 501/29; 501/31

(58) Field of Classification Search .................. 501/27, 501/28, 29, 31; 65/29.16
See application file for complete search history.

(56) References Cited

U.S. PATENT DOCUMENTS

| | | | | | |
|---|---|---|---|---|---|
| 3,149,983 | A | * | 9/1964 | Malarme et al. | 501/30 |
| 3,294,555 | A | * | 12/1966 | Krinov | 501/31 |
| 3,615,811 | A | * | 10/1971 | Barrett | 106/463 |
| 4,211,568 | A | * | 7/1980 | Davis | 501/27 |
| 5,641,717 | A | * | 6/1997 | Castle | 501/33 |
| 6,482,517 | B1 | * | 11/2002 | Anderson | 428/402.24 |
| 2002/0160685 | A1 | * | 10/2002 | Kodas et al. | 445/58 |

FOREIGN PATENT DOCUMENTS

GB 887032 * 1/1962

* cited by examiner

*Primary Examiner*—Karl E Group
*Assistant Examiner*—Noah S Wiese
(74) *Attorney, Agent, or Firm*—Marshall & Melhorn, LLC

(57) ABSTRACT

A process for preparing and storing moist glass-making batch is disclosed, comprising incorporating a surfactant in moist batch so that when the batch is either: a) stored at a temperature below 35° C., it remains free flowing without setting, or b) pre-heated at, or above, 100° C. before supply to a glass melting furnace, it remains free flowing without setting. The moist batch includes from 2% to 10% by weight free water and from 0.0001% to 5% by weight surfactant, which is preferably a soluble soap (for example a carboxylate having from 4 to 22 carbon atoms in its chain) that is incorporated into the batch as it is mixed. The moist batch can be stored for at least 24 hours, and it can be pre-heated to at least 150° C., and remain free flowing without setting.

25 Claims, 3 Drawing Sheets

FREE FLOWING GLASS BATCH

The present invention relates to a method of producing mixed, wet glass batch that remains free flowing when subjected to a range of temperatures, especially those below 35° C. and those above 100° C.

Throughout the glass industry there exists a problem when a decision has to be made as to the type of batch that is to be fed into a furnace for producing molten glass. The ultimate requirement in float glass manufacture is a high quality end glass product, although issues such as minimisation of production costs, pollutant emissions and heat loss from the glass forming process must also be carefully considered. Factors that are likely to influence both the physical and chemical homogeneity and uniformity of the batch, and which therefore affect the quality of the final float glass product, include the degree to which batch materials are mixed as they enter the furnace and the physical condition of the batch materials (for example, whether the batch is wet or dry). The most common defects that occur in float glass, which are on the whole attributable to the consistency of the batch, are those of ream, bubble and inclusions.

Ream is a visible imperfection in the glass that manifests as streaks and changes in the refractive index. Problems with ream may be limited to a small area of the glass or may extend over a large area of a float glass sheet. Bubble is less of a problem than ream, but a problem nonetheless, and consists of blisters in the glass, which are effectively gaseous inclusions that have been trapped in the molten glass batch. The appearance of bubble is common when a batch mixture does not have the required homogeneity. An inclusion is the occurrence of an unmelted batch particle in the final glass product. All three are highly undesirable features that lead to glass being rejected due to its poor quality.

A glass batch comprises a mixture of different raw materials, which are of various sizes, ranging from less than 60 µm to greater than 1 mm in diameter. The batch is usually wet to begin with (as the sand which is used in making the batch is usually wet), although in countries with a colder climate, the batch often has to be dried to prevent it freezing during transportation or storage. With a dry glass batch it is clear that this difference in batch particle size can lead to problems when the batch is transported from where it is mixed to a furnace: segregation of the batch is likely to occur and thus the pre-cursor conditions for occurrence of ream, bubble and inclusions in the final glass product are likely to have been introduced. In addition, finer batch particles often contribute to dusting problems in the batch systems and carry-over problems in the furnace.

The problem of batch segregation may be minimised if the original batch remains wet (rather than being subjected to a drying process). Maintaining the batch in a wet condition minimises dusting and reduces furnace carry-over problems because the batch particles are bound together. Furthermore, a wet glass batch exhibits improved melting characteristics of the batch ingredients, compared to a dry batch, thereby assisting to eliminate the occurrence of the type of glass imperfections that were discussed earlier. The use of wet batch to reduce dusting and enhance melting is described in U.S. Pat. No. 3,294,555 to S M Krinov. Krinov teaches the use of water additions in the range of 1% to 3% to reduce dusting and improve the uniformity of the glass batch, and use of higher proportions of water, in particular 5% to 20%, to additionally enhance the melting characteristics of the batch, increasing the melting rate. The increased melting rate is said to contribute to reduction of blister (bubble) in the melted glass.

The advantages of wetting glass batch are, unfortunately, accompanied by serious disadvantages. Thus, as explained by Krinov, the use of water (especially in the high proportions taught to enhance melting) renders the batch susceptible to hardening or setting such that pneumatic hammers 'and other types of traumatic equipment' are required to break up the batch for use. Krinov teaches overcoming the tendency of the moist batch to harden or set by mixing the moist batch cold; the solid components of the batch are cooled before mixing, preferably to a temperature in the range 10° F. to 30° F., the water used to wet the batch is cooled by refrigeration, preferably to 35° F. to 40° F., and the wet batch is cooled during mixing to maintain the temperature below 70° F. despite the exothermic reactions which occur on the addition of water. Krinov suggests that, by carrying out the mixing at low temperature, the reaction of the water with soda ash present in the batch to form higher hydrates (the heptahydrate and decahydrate) takes place during the mixing operation. If formed after mixing, the hydrates would tend to bind the sand and other glass components setting the batch. Cooling during mixing apparently results in the hydrate crystals being formed, and broken up, during the mixing operation, and there is no tendency for the broken crystals to re-orient and set the batch after mixing.

The Krinov process requires special cooling procedures and is believed not to have been widely used. An alternative, and more widely used, approach to providing high free moisture batch while avoiding setting or hardening of the batch is described by Lehman and Manring in 'Glass Batch Wetting with Water' (The Glass Industry, December 1977, pages 16-34). According to Lehman and Manring, the temperature of the wet batch is maintained above 35.4° C. (the dehydration point of sodium carbonate heptahydrate) to avoid the formation of both the heptahydrate and the decahydrate and minimise the loss of water taken up as water of hydration. However, this technique, which is now in common use, requires moist batch to be stored at a temperature of over 35° C., preferably over 40° C., in order to avoid formation of a higher hydrate and setting of the batch. Moreover, a serious disadvantage of this moist batch is that, if attempts are made to preheat it before supply to the furnace using hot waste gases from the furnace (with consequent saving of energy) it is found to set solid.

SUMMARY OF THE INVENTION

It is an object of the invention to provide a method of producing moist glass batch which can be stored below 40° C., especially below 35° C., without unacceptable hardening or setting and without the need for refrigeration of the water or cooling of the solid batch ingredients before or during mixing.

It is a further object of the invention to provide a moist free flowing glass batch that can be preheated before being fed to a glass-melting furnace without unacceptable hardening or setting of the batch.

The present inventor has found that both these requirements may be met by incorporating a surfactant in the mix, conveniently by adding it to water used to moisten the batch. Although the prior art contemplates the inclusion of a wetting agent or surfactant in the moist batch to enhance wetting of the batch, there is no suggestion in the art that use of a surfactant would enable either of the problems discussed to be overcome.

BRIEF DESCRIPTION OF THE DRAWINGS

For a better understanding, the present invention will now be more particularly described by reference both to the following non-limiting examples and to the accompanying FIGS. wherein.

DETAILED DESCRIPTION OF THE INVENTION

Figure 1:
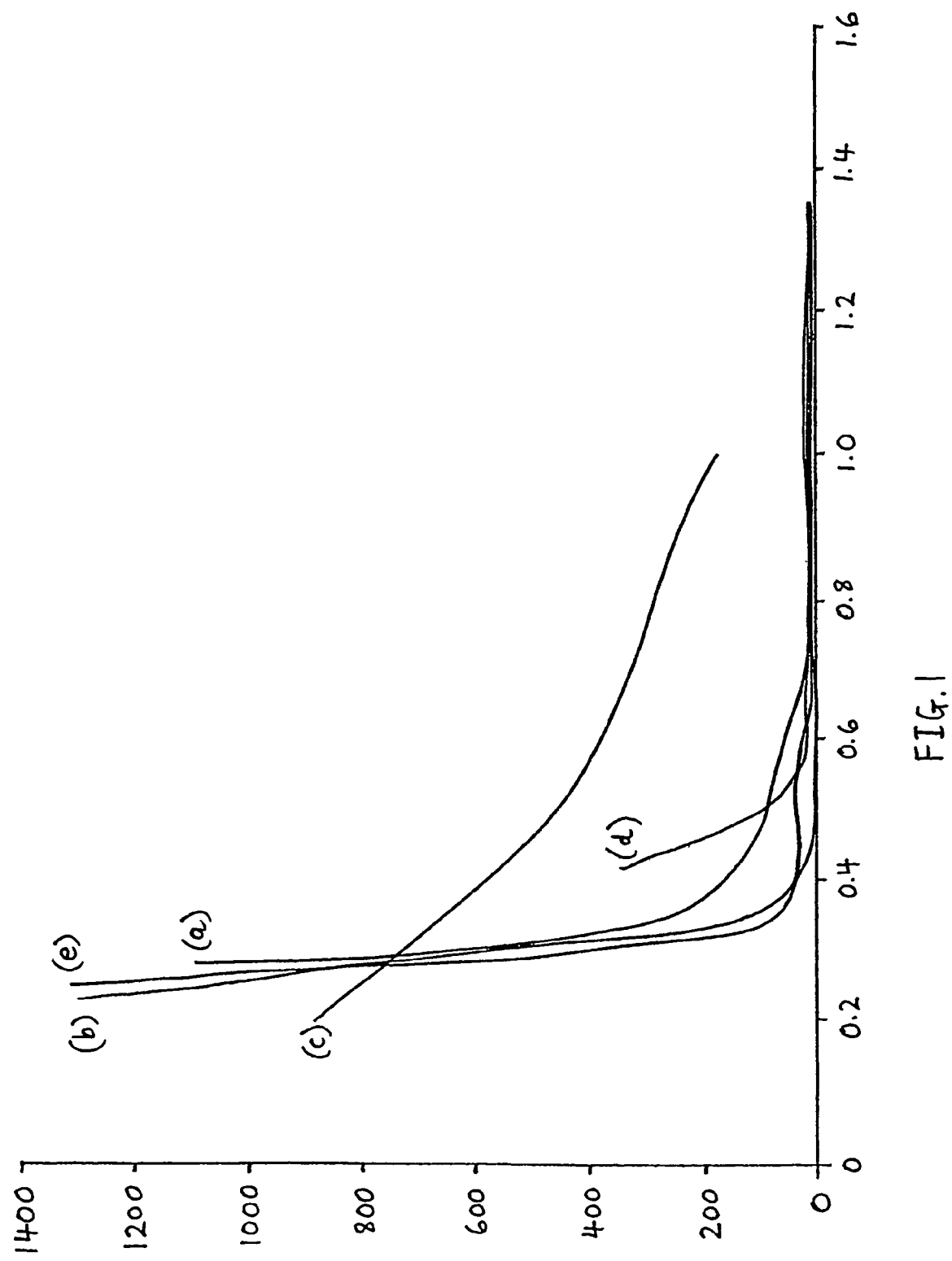
FIG. 1 is a graph of the weight (in grammes) required to penetrate a batch cone (the ordinate) against the percentage by weight of soap in solution based on the weight of the soap solution (the abscissa) for Example 2.

According to a first aspect of the invention, there is provided a process for preparing and storing moist glass-making batch which comprises incorporating a surfactant in moist batch whereby, on storage of the batch at a temperature below 35° C., the batch remains free flowing without setting.

According to a second aspect of the invention, there is provided a process for preparing moist glass-making batch which comprises incorporating a surfactant in the moist batch whereby, on preheating the batch at or above 100° C. before supply to a glass melting furnace, the batch remains free flowing without setting.

The expression 'moist' batch is used to denote batch containing 1% to 20% by batch weight of free water; 'free water' is water which is driven off when the batch is heated under atmospheric pressure at a temperature of at least 110° C., but no greater than 600° C. (at which thermal decomposition of other components of the batch may occur). It is preferred to use batches containing at least 2% free water in order to optimise the melting process, while it is generally preferred to avoid the use of more than 10% free water because, the more water is present, the more heat is required to drive off the water during melting. Furthermore, above 10% free water, batch handling becomes difficult and the water begins to drain from the batch. For optimising melting performance consistent with economic use of heat, the glass batch used will normally contain at least 3%, and no more than 7%, free water.

The surfactant to be incorporated into the moist batch may be chosen from any one of the following four classes of surfactant: anionic, cationic, non-ionic and zwitterionic. Preferably the surfactant is anionic; examples from this class of surfactant tend to have the most pronounced effect upon inhibition of batch hardening, and are thus most effective at achieving a moist batch that remains free flowing without setting. It is further preferable that the anionic surfactants used are soluble soaps. The soluble soaps used are preferably carboxylates having a carbon chain length of between C4 and C22 inclusive, and further preferably having a Group I, II or III counter-ion, especially an alkali metal counter-ion.

The surfactant is preferably incorporated into the batch in liquid form; the amount of liquid typically being 4% of the batch weight. The amount of surfactant added to the batch, as a percentage of the batch weight, is preferably at least 0.0001% so that a discernible effect may be observed as compared to when water alone is used to wet the batch, but no greater than 5% because above this value, the advantage conferred by the surfactant does not increase significantly. Furthermore, at a percentage by batch weight of greater than 5% any cost advantage of using a surfactant in the processes of the present invention begins to disappear when compared to the cost of, for example, maintaining the temperature of the batch above 35° C. When the percentage by batch weight of the surfactant added to the batch is at least 0.01% and no greater than 1%, especially 0.02% to 0.5%, a significant degree of inhibition of the hardening process is observed over a range of surfactants from the different classes. It is most preferable, however, that the surfactant be added at 0.05% of the batch weight because the benefit of its use is maximised with respect to the cost of using it in the processes of the present invention.

The batch materials of the present invention may be mixed and melted in appropriate ratios in generally conventional manner to provide the required glass composition. In the case of float glass, one example of a typical composition (percentages by weight) would be: 72% $SiO_2$, 1% $Al_2O_3$, 0.1% $Fe_2O_3$, 13.5% $Na_2O$, 0.6% $K_2O$, 8.5% CaO, 4% MgO and 0.2% $SO_3$. The batch ingredients may be mixed at the ambient temperature of their surrounding environment with a surfactant and water without refrigeration or even cooling before or during mixing. Indeed, steam may be used to moisten the batch ingredients instead of cooler water, in which case the temperature at which the batch ingredients is mixed will be in the region of between 50° C. and 100° C., depending on factors such as the initial temperature of the batch.

Mixing the batch with steam instead of water is advantageous if the batch is to be further pre-heated. Once mixed, the batch may either be fed directly into a glass making furnace, it may be transported to a glass-making furnace if mixing took place elsewhere, or it may be put into storage until it is needed. Mixed batch that has been wetted with surfactant and water according to the present invention can be stored at temperatures of below 35° C. or less, for example below 30° C. or even below 25° C., for days, weeks or even months without any significant degree of hardening being observed.

As has been mentioned earlier, the surprising effect that a surfactant has when incorporated into a glass batch is additionally important when applied to batch pre-heating systems, wherein furnaces recycle the exhaust gases that result from fuel combustion within the furnace to pre-heat the batch materials before they enter the furnace. Exhaust gases may have temperatures in the region of 1400° C. upon immediate exit of the furnace; thus recycling this heat is a cost-effective measure. Batch is typically pre-heated to temperatures of at least 150° C. (preferably 300° C.) over a period of at least 12 hours (preferably 24 hours). A batch pre-heater such as is claimed by The BOC Group plc in European Patent application number EP 1123903 A2 would be the current pre-heater of choice because it additionally utilises electrostatic forces to remove fine particulate matter from the exhaust gases, thus achieving pollution emission reduction. Prior to the present invention however, it was not possible for moist batch to be successfully introduced into such a pre-heater system because such wet batch that has been wetted without a surfactant exhibits hardening when it is exposed to higher temperatures, especially 100° C. and above.

A wet glass batch that results from the present invention is widely applicable throughout all areas of the glass making industry. A wet glass batch that remains free flowing without setting when subjected to temperatures either below 35° C. or above 100° C. has utility in the flat glass industry, especially in producing float and rolled glasses, in the container glass industry, especially bottles but also tubes (including cathode ray tubes), and also in glass fibre production.

For a better understanding, the present invention will now be more particularly described by reference to the following non-limiting examples.

EXAMPLE 1

The first experiment to assess the performance of a soap solution for use in a method of the invention was based on the following test. A 150 g sample of dry glass batch was made up as follows: sand—91.9 g; soda ash—27.8 g; dolomite—22.8 g; limestone—6.4 g; saltcake—1.09 g. This sample was then thoroughly mixed for 20 minutes at typical room temperature (around 20° C.). 6 ml of water was added to the thoroughly mixed dry batch, and the resultant wet batch was then again thoroughly mixed whilst remaining at typical room temperature (about 20° C.). The wet batch was moulded into a cone having a height of 8 cm and a base diameter of 5 cm. The wet batch cone (having a temperature of less than 35° C.) was then left to stand for one hour at typical room temperature. After this period had elapsed, an indentor probe (of 4 mm diameter) was placed centrally on top of the batch cone, successive weights were added and the maximum weight that the batch cone could support was determined. The procedure was repeated using, in place of the water, dilute aqueous solutions of soap derived from palm kernel acid. When only water is used, the batch cone can sustain over 250 g on the probe. When soap solution is used, the batch cones lose their integrity after 5 minutes making the indentor probe test impossible to perform, but clearly showing the effectiveness of the surfactant in rendering the batch free flowing.

EXAMPLE 2

The performance of a soap solution in maintaining the moist batch free flowing when it is pre-heated prior to supply to a glass melting furnace was experimentally assessed by testing samples of a number of the soap species contained therein as the surfactant of choice. To determine the effectiveness of solutions of these soap species upon the degree of hardening exhibited by an initially wet batch sample after heating, a procedure as described above was followed to produce moulded cones of moist batch, which were transferred to a hot plate at 300° C. and left for 30 minutes. When the 30 minutes had elapsed, the batch cones were subjected to the same indentor probe test as above. In this way, the performance and effect of each soap species upon inhibition of batch hardening could be observed.

To make the various soap solutions for each of the chosen soap species, an initial "mother soap solution" was prepared. The mother solution was diluted until its effect on the cone strength was indistinguishable from pure water. Each volume of diluted soap solution in turn was used as the solution from which the 6 ml of liquid in the tests described above was taken. For each species of soap solution the maximum weight that the batch cone could support after being wetted and subsequently heated as described in the test above was recorded; the results are shown in FIG. 1, in which the ordinate represents the weight (in grammes) required to penetrate a batch cone, the abscissa represents the percentage by weight of soap in solution based on the weight of the soap solution, and the soap species are: (a) palm kernel acid potassium soap, (b) potassium oleate, (c) potassium stearate, (d) potassium caprylate, (e) potassium laurate.

All the soaps tested were readily soluble in water, with the exception of potassium stearate. Each of the potassium soaps tested can be seen to reduce the batch cone strength. When only water is used, the batch cone can sustain over 1 kg on the probe. This is reduced to around 5 g when the soap solutions are used.

EXAMPLE 3

Figure 2:
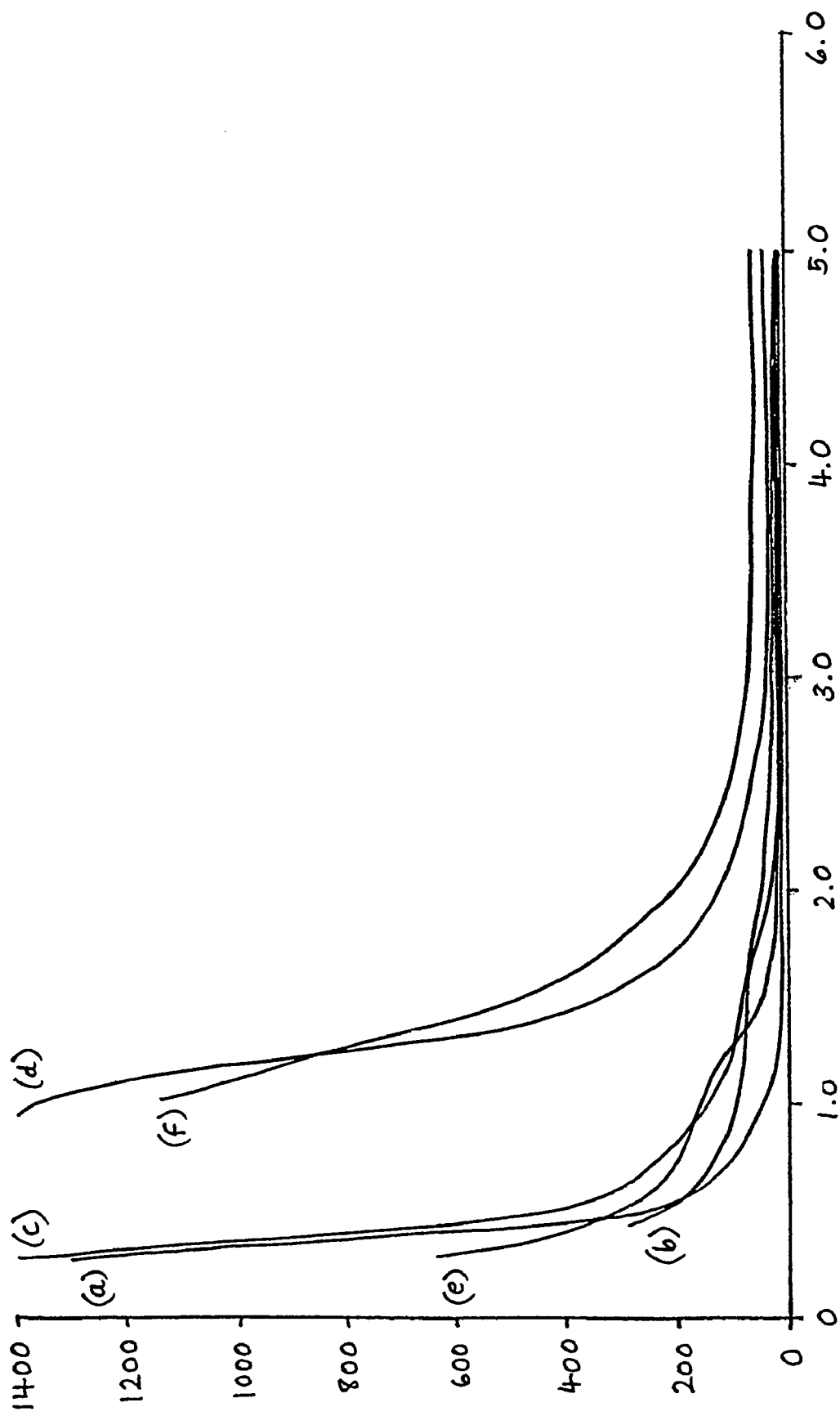
FIG. 2 is a graph of the weight (in grammes) required to penetrate a batch slab (the ordinate) against the percentage by weight of soap in solution based on the weight of the soap solution (the abscissa) for Example 3.

The test procedure in this Example was similar to that described in Example 2, except that, to promote heat transfer from the hot plate to the batch sample, the batch sample was formed into a circular slab, 2 cm high and 6 cm diameter. The strength of the batch slabs was once again measured by placing an indentor probe (of 4 mm diameter) centrally on top of the batch slab and then adding successive weights. The batch used to form the slabs in this experiment was made up as follows: sand—91.9 g; soda ash—28.6 g; dolomite—22.8 g; limestone—5.6 g; gypsum—1.04 g. A number of additional soap species to the soap species used in Example 2 were synthesised (i.e. having a carbon content from C4 to C22) for testing. Again, the performance and effect of each soap upon inhibition of batch hardening could be observed. The results of the tests on the strength of batch slabs as a function of the strength of soap solution are shown in FIG. 2, in which the ordinate represents the weight (in grammes) required to penetrate a batch slab, the abscissa represents the percentage by weight of soap in solution based on the weight of the soap solution, and the soap species are: (a) soap derived from the potassium salt of trans-2-decanoic acid, (b) potassium laurate, (c) soap derived from the potassium salt of octanoic acid, (d) potassium oleate, (e) soap derived from the potassium salt of capric acid, (f) potassium ricolinoleate. Changing the carboxylate counter ion to sodium was also found to have the desired effect of preventing the batch from hardening. Both sodium and potassium soaps are examples of anionic surfactants. Other anionic surfactants were also tested, including sodium dodecyl sulphate and sodium docylbenzensulfonate, and showed beneficial effects in rendering the batch free flowing on storage and/or pre-heating.

EXAMPLE 4

Figure 3:
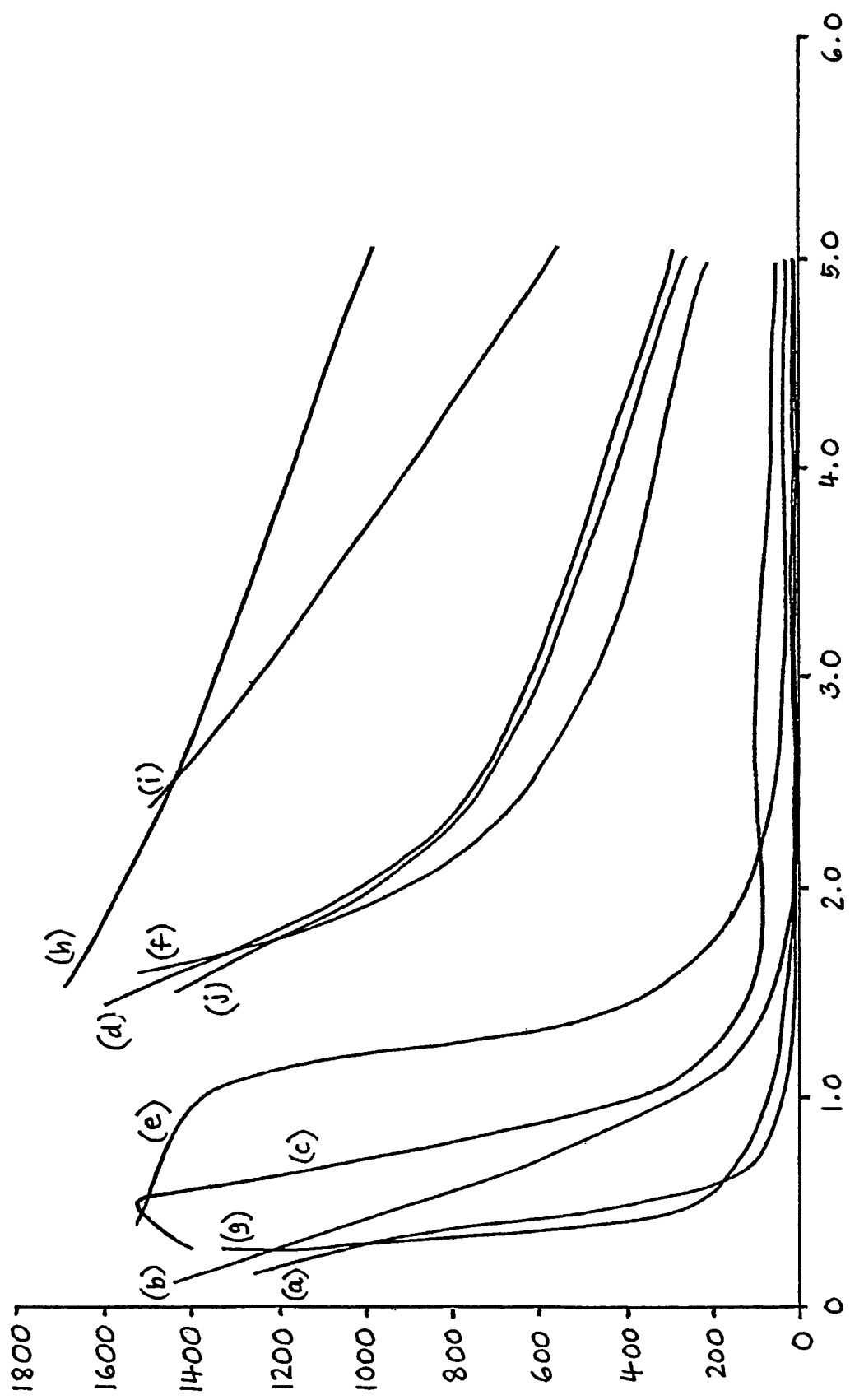
FIG. 3 is a graph of the weight (in grammes) required to penetrate a batch slab (the ordinate) against the percentage by weight of soap in solution based on the weight of the soap solution (the abscissa) for Example 4.

Samples of three other classes of surfactant (cationic, non-ionic and zwitterionic) were further tested as the surfactant of choice. Dodecyltrimethylammonium chloride is a typical cationic surfactant and was assessed using both strength tests described above. There is a wide range of non-ionic surfactants based on ethylene oxide-propylene oxide block copolymers. A sample of Synperionic PE-68 was tested for its effectiveness on inhibition of the batch hardening process. Zwitterionic detergents are relatively rare, 3-(dodecyidimethylammonio)propanesulfonate inner salt was obtained and also assessed in the strength tests. FIG. 3 presents the results of the tests completed with these examples of other classes of surfactants; the batch slabs were made and tested according to the procedure given in Example 3. In FIG. 3, the ordinate represents the weight (in grammes) required to penetrate a batch slab, the abscissa represents the percentage by weight of soap in solution based on the weight of the soap solution, and the soap species are: (a) soap derived from the potassium salt of trans-2-decanoic acid, (b) sodium dodecylbenzene sulphonate, (c) sodium dodecyl sulphate, (d) dodecyltrimethylammonium chloride, (e) potassium oleate, (f) Synperionic PE F-68, (g) sodium oleate, (h) potassium butyrate, (i) dodecyl dimethylammonio-sulfonate, (j) sodium lignosulphonate.

In general, while the anionic surfactants perform better than the other classes of surfactant, a significant reduction in batch strength is found when examples of the other classes of surfactant are used.

EXAMPLE 5

The performance of a soap solution derived from palm kernel acid in maintaining moist batch free flowing when it is pre-heated, prior to supply to a glass melting furnace, was assessed in a full-scale plant trial. A batch pre-heater substantially as described and illustrated (especially in FIGS. 1 and 6) in European patent application number EP 1123903 was used. Dry glass batch including (in an approximate ratio) 87 parts sand, 26 parts soda ash, 22 parts dolomite, 6 parts limestone and 1 part saltcake, was fed into a batch hopper. As the batch moved along a channel towards a batch pre-heater, it was sprayed with a 1.75% concentration soap solution whilst being continually mixed so as to achieve uniform distribution of the soap solution. Upon introduction to the batch pre-heater, the wet batch had a total moisture content of 4% and was at a temperature of around 36° C. The batch was then subjected to heating from a furnace waste-gas stream directed into the bottom of the batch pre-heater, which was at a temperature of around 570° C. As the wet batch moved downward through the pre-heater, its temperature increased thus driving off the water and drying the batch. The dry batch was at a temperature of over 300° C. as it exited the pre-heater, and most importantly it was free-flowing and had remained so as it passed through the pre-heater.

The invention claimed is:

1. A process for preparing and storing moist glass-making batch which comprises incorporating a surfactant in moist batch and storing the batch at a temperature below 30° C. whereby, on storage of the batch at a temperature below 30° C., the batch remains free flowing without setting.

2. A process as claimed in claim 1 wherein the moist batch includes between 2% and 10% free water.

3. A process as claimed in claim 1 wherein the moist batch includes a water-soluble component.

4. A process as claimed in claim 3 wherein the water-soluble component is soda ash.

5. A process as claimed in claim 1 wherein the surfactant is chosen from a group consisting of anionic, cationic, non-ionic and zwitterionic surfactants.

6. A process as claimed in claim 5 wherein the surfactant is anionic.

7. A process as claimed in claim 6 wherein the anionic surfactant is a soluble soap.

8. A process as claimed in claim 7 wherein the soluble soap is a carboxylate having a carbon chain length of between C4 and C22 inclusive.

9. A process as claimed in claim 8 wherein the soluble soap includes a Group I, II or III counter-ion.

10. A process as claimed in claim 1 wherein the surfactant is incorporated into the batch in an amount from 0.0001% to 5% of the weight of the batch.

11. A process as claimed in claim 1 wherein the surfactant is incorporated into the batch as the batch is mixed.

12. A process as claimed in claim 1 wherein the moist batch is stored for at least 24 hours.

13. A process for preparing moist glass-making batch which comprises incorporating a surfactant in the moist batch and preheating the batch at or above 100° C. whereby, on preheating the batch at or above 100° C. before supply to a glass melting furnace, the batch remains free flowing without setting.

14. A process as claimed in claim 13 wherein the batch is pre-heated to a temperature of at least 150° C. before supply to the glass melting furnace.

15. A process as claimed in claim 13 wherein the moist batch includes between 2% and 10% free water.

16. A process as claimed in claim 13 wherein the moist batch includes a water-soluble component.

17. A process as claimed in claim 16 wherein the water-soluble component is soda ash.

18. A process as claimed in claim 13 wherein the surfactant is chosen from a group consisting of anionic, cationic, non-ionic and zwitterionic surfactants.

19. A process as claimed in claim 18 wherein the surfactant is anionic.

20. A process as claimed in claim 19 wherein the anionic surfactant is a soluble soap.

21. A process as claimed in claim 20 wherein the soluble soap is a carboxylate having a carbon chain length of between C4 and C22 inclusive.

22. A process as claimed in claim 20 wherein the soluble soap includes a Group I, II or III counter-ion.

23. A process as claimed in claim 13 wherein the surfactant is incorporated into the batch in an amount from 0.0001% to 5% of the weight of the batch.

24. A process as claimed in claim 13 wherein the surfactant is incorporated into the batch as the batch is mixed.

25. A process as claimed in claim 13 wherein the moist batch is stored for at least 24 hours.

* * * * *